Patented Apr. 6, 1943

2,315,836

UNITED STATES PATENT OFFICE 2,315,836

5-PYRAZOLONE-4-SULPHONIC ACIDS

Paul Zervas, Cologne Mulheim, Germany, assignor to General Aniline & Film Corporation, New York, N. Y., a corporation of Delaware No Drawing. Application August 9, 1941, Serial No. 406,241. In Germany June 9, 1939

6 Claims. (Cl. 260—310)

The present invention relates to a process for the manufacture of 5-pyrazolone-4-sulphonic acids.

If 4 to 5 times the quantity of concentrated sulphuric acid at 200–220° C. or preferably 4 times the quantity of fuming sulphuric acid (30 per cent anhydride) at water bath temperature are allowed to react with phenyl-methyl-pyrazolone, a monosulphonic acid of the phenyl-methyl-pyrazolone is obtained (cf. C. Möllenhoff, Berichte der Deutschen Chemischen Gesellschaft, Jahrgang 25, Seite 1941). The isolated compound is the 1-(4'-sulphophenyl)-3-methyl-5-pyrazolone.

It has now been found that 5-pyrazolone-4-sulphonic acids are obtained quite unexpectedly and with good yields, if the sulphonation mixtures formed by the action of fuming sulphuric acid upon 5-pyrazolones at increased temperatures suitable for the particular pyrazolone are worked up at low temperatures, for instance by pouring them on ice. That the 4-sulphonic acids are actually formed in this manner can easily be proved by the fact that on the one hand the sulphonic acids formed do not yield a dyestuff when mixed with weak diazo solutions (such as diazobenzene) and that on the other hand the products obtained by saponifying with mineral acids the sulphonic acids in question are identical with the starting materials and therefore again capable of coupling. This result of the present process could not be foreseen. In the simplicity of its reaction it means a great technical advance in the preparation of 5-pyrazolone-4-sulphonic acids which are valuable intermediates.

The following examples illustrate the invention without, however, limiting it thereto, the parts being by weight.

Example 1

9.8 parts of 3-methyl-5-pyrazolone are added with cooling to 40 parts of fuming acid containing 30 per cent of anhydride and heated to 50–55° C. for about 3 hours. The sulphonation mixture is poured on ice and the precipitated 3-methyl-5-pyrazolone-4-sulphonic acid is filtered with suction.

Example 2

17.4 parts of 1-phenyl-3-methyl-5-pyrazolone are added with cooling to 70 parts of fuming sulphuric acid containing 20 per cent of anhydride. The solution obtained is heated to 50–55° C. until a test portion yields with diazobenzene solution in the presence of sodium carbonate no longer a dyestuff. The sulphonation mixture is poured on ice. The acid solution thus obtained is neutralized under good cooling with sodium hydroxide solution and evaporated, whereby the easily soluble sodium salt of 1-phenyl-3-methyl-5-pyrazolone-4-sulphonic acid precipitates in good yield.

If, however, the sulphonation of 1-phenyl-3-methyl-5-pyrazolone is effected at water bath temperature with fuming sulphuric acid containing 30 per cent of anhydride 1-(4'-sulphophenyl)-3-methyl-5-pyrazolone-4-sulphonic acid is obtained when working up the sulphonation mixture at low temperature.

Example 3

21.9 parts of 1-(4'-nitrophenyl)-3-methyl-5-pyrazolone are added with cooling to 90 parts of fuming sulphuric acid containing 20 per cent of anhydride. The solution obtained is heated to 85° C. for about 3 hours; a test portion yields now with diazobenzene solution in the presence of sodium carbonate no longer a dyestuff. The sulphonation mixture is poured on ice, the acid solution is filtered to remove some impurities and rendered under good cooling distinctly alkaline with sodium hydroxide solution. From the alkaline solution the sodium salt of 1-(4'-nitrophenyl)-3-methyl-5-pyrazolone-4-sulphonic acid precipitates in good yield when adding sodium chloride.

If, instead of 1-(4'-nitrophenyl)-3-methyl-5-pyrazolone 1-(3'-nitrophenyl)-3-methyl-5-pyrazolone and instead of fuming sulphuric acid containing 20 per cent of anhydride a fuming sulphuric acid containing 30 per cent of anhydride are used the sodium salt of 1-(3'-nitrophenyl)-3-methyl-5-pyrazolone-4-sulphonic acid is obtained in the same manner.

Example 4

24.9 parts of 1-(3'-nitrophenyl)-5-pyrazolone-3-carboxylic acid are added with cooling to 100 parts of fuming sulphuric acid containing 30 per cent of anhydride and heated to 85° C. until a test portion yields with diazobenzene solution in the presence of sodium carbonate no longer a dyestuff. The sulphonation mixture is poured on ice and the precipitated 1-(3'-nitrophenyl)-5-pyrazolone-3-carboxylic acid-4-sulphonic acid is filtered with suction.

Example 5

22.6 parts of the hydrochloride of 1-(4'-aminophenyl)-3-methyl-5-pyrazolone are added to 100 parts of fuming sulphuric acid containing 20 per cent of anhydride and the mixture is heated at water bath temperature for about 4 hours until the sulphonation is complete. The sulphonation mixture is poured on as small a quantity of ice as possible. After some time the sulphuric acid salt of 1-(4'-aminophenyl)-3-methyl-5-pyrazolone-4-sulphonic acid precipitates.

If, instead of the hydrochloride of 1-(4'-aminophenyl)-3-methyl-5-pyrazolone the hydrochloride of 1-(3'-aminophenyl)-3-methyl-5-pyrazolone or the 1-(3'-aminophenyl)-5-pyrazolone-3-carboxylic acid and instead of fuming sulphuric acid containing 20 per cent of anhydride a fuming sulphuric acid containing 30 per cent of anhydride is used 1-(3'-aminophenyl)-3-methyl-5-pyrazolone-4-sulphonic acid or 1-(3'-aminophenyl)-5-pyrazolone-3-carboxylic acid-4-sulphonic acid is obtained in the same manner.

I claim:

1. Process of preparing 1-phenyl-3-methyl-5-pyrazolone-4-sulphonic acid which comprises pouring on ice the sulphonation mixture formed by the action of fuming sulphuric acid containing 20 per cent of anhydride upon 1-phenyl-3-methyl-5-pyrazolone at 50–55° C.

2. Process of preparing 1-(4'-aminophenyl)-3-methyl-5-pyrazolone-4-sulphonic acid which comprises pouring on ice the sulphonation mixture formed by the action of fuming sulphuric acid containing 20 per cent of anhydride upon 1-(4'-aminophenyl)-3-methyl-5-pyrazolone at water bath temperature.

3. Process of preparing 1-(3'-aminophenyl)-5-pyrazolone-3-carboxylic acid-4-sulphonic acid which comprises pouring on ice the sulphonation mixture formed by the action of fuming sulphonic acid containing 30 per cent of anhydride upon 1-(3'-aminophenyl)-5-pyrazolone-3-carboxylic acid at water bath temperature.

4. Process of preparing 5-pyrazolone-4-sulphonic acids which are substituted in the 3 position by a member of the group consisting of methyl and carboxyl groups which comprises heating 5-pyrazolones which are substituted in the 3 position by a member of the group consisting of methyl and carboxyl groups with fuming sulphuric acid and pouring the reaction mixture on ice.

5. Process of preparing 5-pyrazolone-4-sulphonic acids substituted in the 3 position by a member of the group consisting of methyl and carboxyl groups which comprises heating 5-pyrazolones substituted in the 3 position by a member of the group consisting of methyl and carboxyl groups at temperatures between about 50° C. and about 100° C. with fuming sulphuric acid containing anhydride from about 20% to 30% and pouring the reaction mixture on ice.

6. Process of preparing 5-pyrazolone-4-sulphonic acid substituted in the 3 position by a member of the group consisting of the methyl and carboxyl groups which comprises heating 5-pyrazolones substituted in the 3 position by a member of the group consisting of methyl and carboxyl groups at temperatures between about 50° C. and water bath temperature with fuming sulphuric acid and pouring the reaction mixture on ice.

PAUL ZERVAS.